United States Patent Office 3,414,590
Patented Dec. 3, 1968

3,414,590
9β,10α-Δ$^{6,16}$-BISDEHYDRO PROGESTERONES AND INTERMEDIATES IN THE PREPARATION THEREOF
Engbert Harmen Reerink, Pieter Westerhof, and Hendrik Frederik Louis Scholer, Van Houtenlaan, Weesp, Netherlands, assignors to North American Philips Company, Inc., New York, N.Y., a corporation of Delaware
No Drawing. Continuation of application Ser. No. 472,694, July 16, 1965. This application Nov. 14, 1966, Ser. No. 594,258
5 Claims. (Cl. 260—397.3)

The instant application is a continuation of Ser. No. 472,694 filed July 16, 1965 and now abandoned.

The invention relates to novel 9β, 10α-steroids of the general formula:

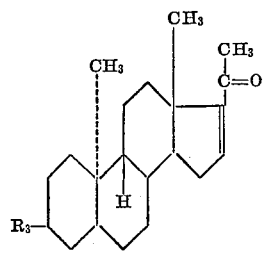

in which formula R$_3$ is a
3-keto-4-dehydro-,
3-keto-4,6-bisdehydro-,
3-keto-1,4-bisdehydro-,
3-keto-1,4,6-trisdehydro-
3-alkoxy-3,5-bisdehydro- or a
3-acyloxy-3,5-bisdehydro-group.

It should be noted that the stereochemical configuration of the steroid skeleton of the compounds according to the invention at carbon atoms 8, 9, 10, 13 and 14 is the same as that of dihydroisolumisterone at the corresponding carbon atoms. Castells et al. (Proc. of the Chem. Soc. 1958, page 7) proved that dihydroisolumisterone has the configuration of 8β, 9β, 10α, 13β, 14α. Normal steroids have the configuration: 8β, 9α, 10β, 13β, 14α.

The steroids according to the invention are designated by the prefix "9β, 10α" in order to indicate at which carbon atoms (9 and 10) the configuration deviates from that of normal steroids and in which sense (9β, 10α instead of 9α, 10β).

The compounds according to the invention have a pronounced hormonal activity.

In general, these compounds have a gonadotropine-inhibiting effect. Particularly 9β, 10α-pregna-4,6-16-triene-3,20-dione is anti-gonadotropic and inhibits the action of FSH. This compound is furthermore weakly progestational, substantially non-androgenic and substantially non-oestrogenic. The compound 9β, 10α-pregna-4,16-diene-3,20-dione is gonadotropine inhibiting and anti-oestrogenic and weakly progestational. The compounds 9β, 10α-pregna-1,4,6-, 16-tetraene - 3,20 - dione is also gonadotropine-inhibiting and furthermore weakly antioestrogenic.

Important compounds according to the invention are for example 9β, 10α-pregna-4,16-diene-3,20-dione 9β, 10α-pregna-4,6,16-triene-3,20-dione,
9β, 10α-pregna-1,4,6,16-tetraene-3,20-dione,
3-acetoxy-9β,10α-pregna-3,5,16-triene-20-one.

The compounds according to the invention may be produced by methods suitable for the production of corresponding compounds.

In general, for the introduction of a double bond between the carbon atoms 16 and 17 and for that between the carbon atoms 1, 2 and 6, 7 methods may be employed which are or may be used for the introduction of double bonds at the same places in normal steroids or in other 9β,10α-steroids.

A 3-acyloxy-3,5-bisdehydro-group may be introduced by reacting a 3-keto-4-dehydro-9β,10α-steroid with an isopropenylacylate. This reaction is particularly suitable for producing a 3-acetoxy-3,5-bisdehydro-compound by reaction with isopropenylacetate. The reaction is preferably carried out in the presence of sulphuric acid as a catalyst.

A 3-alkoxy-3,5-bisdehydro-group may be introduced by reacting a 3-keto-4-dehydro-9β,10α-steroid with an alkylester of orthoformic acid in the presence of a paratoluenesulphonic acid as a catalyst. The reaction is preferably carried out in the presence of an indifferent solvent, for example benzene or toluene. In this way 3-ethoxy ethers can be produced with satisfactory yields (i.e. by the reaction with ethylester of orthoformic acid).

An interesting method of introducing a 16-dehydro double bond for producing the compounds according to the invention consists in splitting off the group R$_{16}$ and the hydrogen atom of carbon atom 17 from compounds of the following formula:

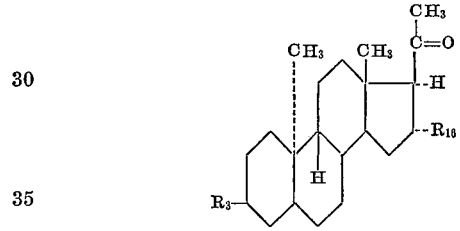

In this formula R$_3$ has the same meaning as indicated in the definition of the compounds according to the invention, whereas R$_{16}$ is a free, etherified or esterified hydroxy group.

In the compounds according to said formula there is contained the group R$_{16}$ preferably in the α-position, mainly because these compounds can be fairly easily produced, especially by microbiological hydroxylation, as the case may be, followed by esterification or etherification. For the microbiological hydroxylation use may be made of one of the micro-organisms, spores or enzyme systems thereof, which are indicated in Belgian patent specification 638,760 or 638,635.

The etherification of the 16-hydroxy-group may be carried out in a conventional manner, for example by reaction of the 16-hydroxy-compound with an aliphatic alcohol having 1 to 6 carbon atoms in an acidic medium or with dialkylsulphate. Other methods have been described in the co-pending application Ser. No. 472,683 now Patent No. 3,364,206 of the applicant, directed to certain particular etherified 16-hydroxy-9β,10α-steroids.

For the esterification of 16α-hydroxy-compounds use may be made of the conevntional esterification methods. Mention may be made of the acid chlorides in the presence of an organic base such as pyridine or collidine.

The free etherified or esterified 16-hydroxyl-group, together with the 17α-hydrogen atom, can be split off by treatment with a base. Use may be made of alkali- or alkali-earth hydroxides for example sodium-hydroxide or calcium-hydroxide or organic bases such as tertiary amines, for example pyridine or collidine. This reaction gives particularly satisfying results with 16α-hydroxy-9β,10α-steroids or certain esters thereof, for example the para-toluene sulphonic acid ester or the methane sulphonic acid ester.

The separation of the free hydroxyl-group from the 16α-hydroxy-compounds is performed very satisfactorily, when a solution of the compounds, for example in a lower aliphatic alcohol such as methanol, ethanol, propanol, or propanol-2 is treated with a diluted solution of an alkali-hydroxide, particularly sodium hydroxide or potassium hydroxide. The hydroxide is preferably added in the form of such a solution to the solution of the 16-hydroxy-compound that dehydration takes place in a homogeneous medium. If the 16-hydroxy-compound is dissolved in a lower aliphatic alcohol, the hydroxide can be satisfactorily added to this solution in the form of a diluted aqueous solution. The reaction is preferably performed at a temperature between about 10° C. and about 60° C.

The free hydroxyl-group of 16-hydroxy-compound may furthermore be split off by a treatment with a water-extracting agent. Use may be made for example of para-toluene sulphonic acid, sulphuric acid or potassium bisulphate. These agents are preferably added in comparatively small supplies in a ratio of about 1 part by volume of water-extracting agent to 25 to 250 parts by weight of 16-hydroxy-compounds.

The reaction may be carried out at a temperature above room-temperature, for example at the boiling temperature of the solvent, if it lies between 50° C. and 100° C.

Very good results are obtained by treating a 16-hydroxy-ester, preferably in the form of the paratoluene sulphonic acid ester or of the methane sulphonic acid ester, with a base. These esters can be produced by reacting a solution of the 16-hydroxy compound with the corresponding sulphonic acid chloride in the presence of a hydrochloride acid binder. To this end use may be made in general of bases, for example sodium hydroxide or organic bases such as pyridine or collidine, or diethyl- or dimethylaniline.

The production of the methane sulphonic acid ester, followed by the separation thereof, is preferably carried out by reacting the 16-hydroxy compound with dimethylformamide in the presence of a base and of sulphur dioxide.

It is fairly indifferent which step is chosen last for the production of the compounds according to the invention, this is not basically important. The separation of a 16-hydroxy-group may for example be chosen as the last reaction, but in a different case the introduction of a 1-dehydro double bond or of a 3-alkoxy-3,5-bisdehydro- or 3-acyloxy-3,5-bisdehydro-group may be last.

1,2-dehydro- and 6,7-dehydro-double bonds may be introduced by methods known per se. For the introduction of a 1,2 double bond use may be made of dehydration of a 3-keto-4-dehydro-9β, 10α-steroid or of the corresponding 4,6-bisdehydro-compound with selenium dioxide or 2,3-dichloro - 5,6 - dicyanobenzoquinone if desired in the presence of hydrochloric acid. A 6,7-dehydro-bond may be introduced by reacting a 3-keto-4-dehydro- or the corresponding 3-keto-1,4-bisdehydro-9β-10α-steroid with 2,3-dichloro-5,6-dicyanobenzoquinone in an acidic medium or with chloranyl.

It should be noted that for the production of the starting compounds for the production of the compounds according to the invention the 16-hydroxy-group may be introduced, at will, into 3-keto-4-dehydro- or 3-keto-1,4-bisdehydro- or 3-keto-4,6-bisdehydro- or 3-keto-1,4,6-trisdehydro-9β,10α-steroids or conversely the 1,2-dehydro- and/or 6,7-dehydro-bond into 9β,10α-steroids, in which a 16-hydroxy-group is already contained, and which group may be protected.

The compounds according to the invention may be worked up in a conventional manner to pharmaceutic preparations. Injection liquids are produced by dissolving a compound according to the invention in methylene chloride. This solution is dissolved in arachide oil, after which the methylene chloride is evaporated. Suppositories may be made by intimately mixing an active compound with the ester of a higher aliphatic alcohol and a higher aliphatic carboxylic acid, for example carbo-waxes or cacao butter or with a mixture of gelatine and glycerol. The compounds according to the invention may furthermore be worked up in tablets with the conventional filters such as starch or binders or lubricants, for example magnesium stearate, carboxy-methycellulose and the like.

EXAMPLES (1) Production of 9β, 10α-pregna-4,16-diene-3,20-dione from 16α-hydroxy-9β, 10α-pregn-4-ene-3,20-dione 5 gs. of 16α-hydroxy-9β, 10α-pregn-4-ene-3,20-dione was dissolved in 500 mls. of benzene. After the addition of 100 mgs. of p-toluene sulphonic acid the solution was refluxed for one hour. Then the solvent was distilled off in vacuo and the residue was dissolved in methylene chloride. After washing with sodium bicarbonate and water and after drying, the mixture was evaporated to dryness and the residue (4.9 gs.) was chromatographed over silica-gel. Final yield was 3.8 gs. of a pure fraction, which melted after crystallisation from methanol, at 165–167°. The infrared showed inter alia the following bands: 1663, 1616, 1579, 1368, 1233, 947, 862 and 824 cm.$^{-1}$. $\epsilon$ ($\lambda_{max}$ 240) =25,300.

(2) Production of 9β, 10α-pregna-4,16-triene-3,20-dione from 16α-hydroxy-9β, 10α-pregna-4,6-diene-3,20-dione 10 gs. of 16α-hydroxy-9β, 10α-pregna-4,6-diene-3,20-dione was dissolved in 200 mls. of alcohol. To this solution there was added 50 mls. of a 2 N solution of sodium hydroxide in water. After reaction for two hours at room temperature the solution was neutralised by adding 1/2 N sulphuric acid in water. Then 500 mls. of water was added and extraction was carried out with methylene chloride. The extract was washed with water, dried on sodium sulphate and evaporated in vacuo. The residue was chromatographed on silica-gel. Yield 5.1 gs. of pure substance, which, after crystallisation from acetone/hexane, had a melting point 131–132°. The infrared spectrum showed inter alia the following bands: 1655, 1621, 1580, 1364, 1226, 972 and 899 cm.$^{-1}$.

$\epsilon(\lambda_{max.}=238)=11,700$.
$\epsilon(\lambda_{max.}=285)=25,800$.
$[\alpha]_D=417$ (dioxane).

(3) Production of 9β, 10α-pregna-1,4,6,16-tetra-ene-3,20-dione from 9β, 10α-pregna-4,6,16-triene-3,20-dione 5 gs. of 9β, 10α-pregna-4,6,16-triene-3,20-dione and 5 gs. of 2,3-dichloro-5,6-dicyanozenzoquinone were dissolved in 159 mls. of dioxane, to which solution was added 4 mls. of a solution of HCl in dioxane (1 mg./ml.). After a reaction period of five hours at room temperature 4 g. of sodium bicarbonate was added. The reaction mixture was stirred for 5 minutes and subsequently refluxed during 3 hours. Then the solid substances were filtered off. The reaction mixture was poured into an aqueous solution of sodium chloride and therefrom the organic material was extracted with diethylether. The residue was dissolved in methylene chloride and washed with water and 1 N sodium hydroxide solution. After drying the solvent was removed and the residue was chromatographed on silica gel. After crystallisation from acetone/hexane 2.4 gs. of pure substance was obtained; it had a melting point of 161–162°. The infrared showed inter alia the following bands: 1669, 1652, 1609, 1591, 1582, 1229, 885, 876, 762 cm.$^{-1}$.

(4) Production of 3-acetoxy-9β,10α-pregna-3,5,16-triene-20-one from 9β,10α-pregna-4,16-diene-3,20-dione 9β,10α-pregna-4,16-diene-3,20-dione produced as described in Example 1 was dissolved in thiophene-free benzene, to which solution was added 10 parts by weight of para-toluene sulphonic acid (calculated on the quantity of 9β,10α-steroid) and then a quantity slightly exceeding the equimolar quantity of isopropenylacetate was added, after which the solvent was carefully distilled off, whilst nitrogen was passed over. The residue was poured out on ice, diluted with diethyl ether, after which the total organic layers were washed with water and sodium bicarbonate solutions. The organic layer was dried on sodium sulphate, and to the filtrate was added 1% by volume of pyridine. After distilling off the solvent, the resinous residue was dissolved in dry methanol, to which 1% by weight of pyridine was added and from this medium it was recrystallised. The resultant 3-acetoxy-9β,10α-pregna-3,5,16-triene-20-one had a melting point of 125–128°.

$\epsilon(\lambda_{max}.237) = 23,900$ $[\alpha]_D = +122$ (dioxane).

(5) Injection liquids of 9β,10α-pregna-4,16-diene-3,20-dione were prepared as follows 5.00 gs. of the active ingredient was dissolved in 90 mls. of a solution of 2% of anhydrous benzylalcohol and 46% of anhydrous benzylbenzoate in castor oil at a temperature of 60° C.

The solution was cooled to room temperature and completed to 100 mls. with the aforesaid castor oil solution. The mixture was homogenized by stirring and filtered. Ampullae and flasks were filled with the filtered solution, then decanted and sterilised by heating for one hour at 120°.

We claim:

1. 9β,10α-steroids of the formula:

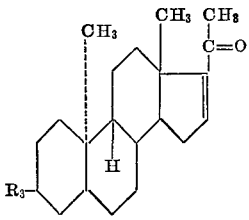

in which formula:

R₃ is a member selected from the group consisting of 3-keto-4-dehydro-,
3-keto-4,6-bisdehydro-,
3-keto-1,4-bisdehydro and the
3-keto-1,4,6-trisdehydro-group.

2. A 9β,10α-steroid of claim 1 corresponding to the formula:

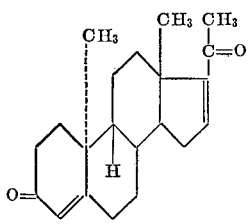

3. A 9β,10α-steroid of claim 1 corresponding to the formula:

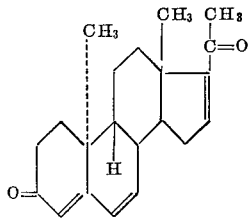

4. A 9β,10α-steroid of claim 1 corresponding to the formula:

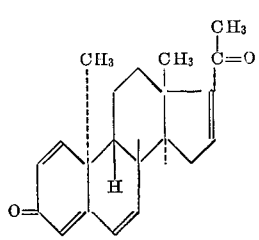

5. A 9β,10α-steroid of claim 1 corresponding to the formula:

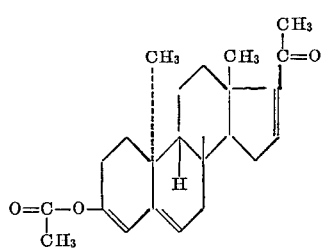

References Cited

UNITED STATES PATENTS

| | | | |
|---|---|---|---|
| 2,837,464 | 6/1958 | Nobile | 195—51 |
| 3,060,175 | 10/1962 | Origoni et al. | 260—239.55 |
| 3,132,137 | 5/1964 | Clinton | 260—239.5 |
| 2,900,382 | 8/1959 | Sondheimer et al. | 260—239.55 |
| 2,925,428 | 2/1960 | Djerassi et al. | 260—397.4 |

ELBERT L. ROBERTS, *Primary Examiner.*

UNITED STATES PATENT OFFICE
CERTIFICATE OF CORRECTION

Patent No. 3,414,590

December 3, 1968

Engbert Harmen Reerink et al.

It is certified that error appears in the above identified patent and that said Letters Patent are hereby corrected as shown below:

Column 4, line 25, "4,16-triene" should read -- 4,6,16-triene --.

Signed and sealed this 31st day of March 1970.

(SEAL)
Attest:

Edward M. Fletcher, Jr.
Attesting Officer

WILLIAM E. SCHUYLER, JR.
Commissioner of Patents